United States Patent
Uchimoto

(10) Patent No.: US 11,289,268 B2
(45) Date of Patent: Mar. 29, 2022

(54) TRANSMISSION COIL FOR WIRELESS POWER SUPPLY, TRANSMISSION ANTENNA, WIRELESS POWER TRANSMITTER, AND CHARGER

(71) Applicant: ROHM Co., LTD., Kyoto (JP)

(72) Inventor: Daisuke Uchimoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 16/828,014

(22) Filed: Mar. 24, 2020

(65) Prior Publication Data

US 2020/0312545 A1 Oct. 1, 2020

(30) Foreign Application Priority Data

Mar. 29, 2019 (JP) .............................. JP2019-065944

(51) Int. Cl.
| | | |
|---|---|---|
| H02J 5/00 | (2016.01) | |
| H02J 7/02 | (2016.01) | |
| H02J 50/12 | (2016.01) | |
| H02J 50/40 | (2016.01) | |
| H01F 38/14 | (2006.01) | |
| H04B 5/02 | (2006.01) | |
| H02J 7/00 | (2006.01) | |

(52) U.S. Cl.
CPC ............ *H01F 38/14* (2013.01); *H02J 7/0042* (2013.01); *H02J 7/02* (2013.01); *H02J 50/12* (2016.02); *H02J 50/40* (2016.02); *H04B 5/02* (2013.01)

(58) Field of Classification Search
None
See application file for complete search history.

(56) References Cited

U.S. PATENT DOCUMENTS

| | | | | |
|---|---|---|---|---|
| 8,338,990 | B2 * | 12/2012 | Baarman | H04B 5/0062 |
| | | | | 307/104 |
| 9,871,383 | B2 * | 1/2018 | Park | H02J 50/005 |
| 10,804,816 | B2 * | 10/2020 | Harrison | H02M 7/48 |
| 10,832,849 | B2 * | 11/2020 | Hwang | C09K 5/14 |
| 10,910,864 | B2 * | 2/2021 | Kim | H01F 38/14 |
| 2018/0198322 | A1 * | 7/2018 | Mercier | H02J 50/12 |

FOREIGN PATENT DOCUMENTS

| | | |
|---|---|---|
| JP | 5071574 B1 | 11/2012 |
| JP | 2013-38854 A | 2/2013 |

* cited by examiner

*Primary Examiner* — Kenneth B Wells
(74) *Attorney, Agent, or Firm* — Chip Law Group

(57) ABSTRACT

A transmission coil used in a wireless power transmitter includes a first coil, a second coil electrically connected in series with the first coil, and a tap provided at a connection node of the first coil and the second coil, the first coil and the second coil being stacked to at least partially overlap with each other. A transmission antenna includes the transmission coil, a first capacitor and a second capacitor connected in series with the transmission coil, and a switch provided in parallel to a series connection circuit of the second coil of the transmission coil and the second capacitor. A wireless power transmitter includes the transmission antenna and a bridge circuit that drives the transmission antenna. A charger includes the wireless power transmitter.

7 Claims, 12 Drawing Sheets

TRANSMISSION COIL FOR WIRELESS POWER SUPPLY, TRANSMISSION ANTENNA, WIRELESS POWER TRANSMITTER, AND CHARGER

CROSS REFERENCE TO RELATED APPLICATIONS

This US. Application claims priority benefit of Japanese Patent Application No. 2019-065944 filed in the Japan Patent Office on Mar. 29, 2019. Each of the The above-referenced applications application is hereby incorporated herein by reference in its entirety.

BACKGROUND

The present disclosure relates to a wireless power supply technique, and particularly to a transmission coil of a wireless power transmitter.

In recent years, wireless power supply has started to be widely used as a power supply system for an electronic device. There are two systems of wireless power supply, that is, a magnetic induction (MI) system and a magnetic resonance (MR) system. In the MI system, a standard "Qi" established by Wireless Power Consortium (WPC) is currently the mainstream.

The wireless power supply of the MI system uses magnetic induction between a transmission coil and a reception coil. A power supply system includes a power supply apparatus including the transmission coil and a power receiver including the reception coil.

FIG. 1 is a diagram illustrating a configuration of a wireless power supply system 10 compliant with the Qi standard. The power supply system 10 includes a power transmitter 20 (TX) and a power receiver 30 (RX). The power receiver 30 is mounted on an electronic device, such as a mobile phone terminal, a smartphone, an audio player, a gaming device, and a tablet terminal.

The power transmitter 20 includes a transmission coil (primary coil) 22, a driver 24, a power transmission controller 26, and a demodulator 28. The driver 24 includes an H-bridge circuit (full-bridge circuit) or a half-bridge circuit and applies a driving signal S1, specifically, a pulse signal, to the transmission coil 22. The driving current flowing through the transmission coil 22 generates a power signal S2 of an electromagnetic field in the transmission coil 22. The power transmission controller 26 comprehensively controls the entire power transmitter 20, and specifically, controls the switching frequency of the driver 24, the duty ratio of switching, the phase, and the like to change the transmission power.

The power receiver 30 includes a reception coil (secondary coil) 32, a rectifier circuit 34, a smoothing capacitor 36, a modulator 38, a load 40, a power reception controller 42, and a power supply circuit 44. The reception coil 32 receives the power signal S2 from the transmission coil 22. The rectifier circuit 34 and the smoothing capacitor 36 rectify and smooth a current S4 induced in the reception coil 32 according to the power signal S2 and convert the current S4 into a direct-current (DC) voltage.

The power supply circuit 44 uses power supplied from the power transmitter 20 to charge a secondary battery not illustrated or steps up or down a DC voltage VRECT to supply the DC voltage VRECT to the power reception controller 42 or other loads 40.

In the Qi standard, a communication protocol is established between the power transmitter 20 and the power receiver 30, and a control signal S3 can be used to transmit information from the power receiver 30 to the power transmitter 20. Backscatter modulation is used to perform amplitude modulation (AM) of the control signal S3, and the control signal S3 is transmitted from the reception coil 32 (secondary coil) to the transmission coil 22. The control signal S3 includes, for example, power control data (also referred to as "packet") for controlling the supply of power to the power receiver 30 and data indicating information specific to the power receiver 30.

The power control will be described. The power reception controller 42 of the power receiver 30 generates power control data for controlling the supply of power (transmission power) from the power transmitter 20. For example, the power reception controller 42 generates a power control packet to bring the voltage VRECT of the smoothing capacitor 36 close to a desired point (DP) of the voltage VRECT. The modulator 38 modulates the current (or voltage) of the reception coil 32 based on the power control packet. As a result, the reception coil 32 serves as a transmission antenna, and the control signal S3 is transmitted.

In the power transmitter 20, current components corresponding to the control signal S3 flow through the transmission coil 22. The demodulator 28 demodulates the control signal S3 included in the current or the voltage of the transmission coil 22. The power transmission controller 26 controls the driver 24 to obtain the transmission power instructed by the power control data included in the demodulated control signal S3.

In this way, feedback control is performed to bring the transmission power into line with the power requested by the power receiver side in the power supply system 10 compliant with the Qi standard. The feedback control of the transmission power is similarly performed in the Power Matters Alliance (PMA) standard.

Examples of patent documents include Japanese Patent Laid-Open No. 2013-38854 and Japanese Patent No. 5071574.

SUMMARY

Although the transmission power of the Qi standard is currently 5 to 15 W (Extended Power Profile (EPP)), it is planned to increase the transmission power to 60 to 100 W (Medium Power) for the next generation. In a case where the same power transmitter supports both 15 W and 60 W, there can be an approach of using a plurality of transmission coils arranged in an array. However, there is a problem that the area becomes large, and the cost increases.

The present disclosure has been made in view of this problem, and an example of an object of a mode of the present disclosure is to miniaturize the transmission coil.

A mode of the present disclosure relates to a transmission coil used in a wireless power transmitter. The transmission coil includes a first coil, a second coil electrically connected in series with the first coil, and a tap provided at a connection node of the first coil and the second coil. The first coil and the second coil are stacked to at least partially overlap with each other.

High power can be transmitted by driving both the first coil and the second coil, and low power can be transmitted by driving only one of the first coil and the second coil. According to the mode, the area can be reduced by placing the two coils on top of each other.

Centers of the first coil and the second coil may match.

Inner diameters of the first coil and the second coil may be substantially equal, and outer diameters of the first coil and the second coil may be different.

The outer diameters of the first coil and the second coil may be substantially equal, and the inner diameters of the first coil and the second coil may be different.

Another mode of the present disclosure relates to a transmission antenna. The transmission antenna may include the transmission coil, a first capacitor and a second capacitor connected in series with the transmission coil, and a switch provided in parallel to a series connection circuit of the second coil of the transmission coil and the second capacitor.

Another mode of the present disclosure relates to a wireless power transmitter. The wireless power transmitter may include the transmission antenna, and a bridge circuit that drives the transmission antenna.

Note that an arbitrary combination of the constituent elements and things obtained by replacing the constituent elements or the expressions of the present disclosure with each other between methods, apparatuses, systems, or the like are also effective as modes of the present disclosure.

According to a mode of the present disclosure, the transmission coil can be miniaturized.

DETAILED DESCRIPTION OF THE PREFERRED EMBODIMENT

Figure 1:
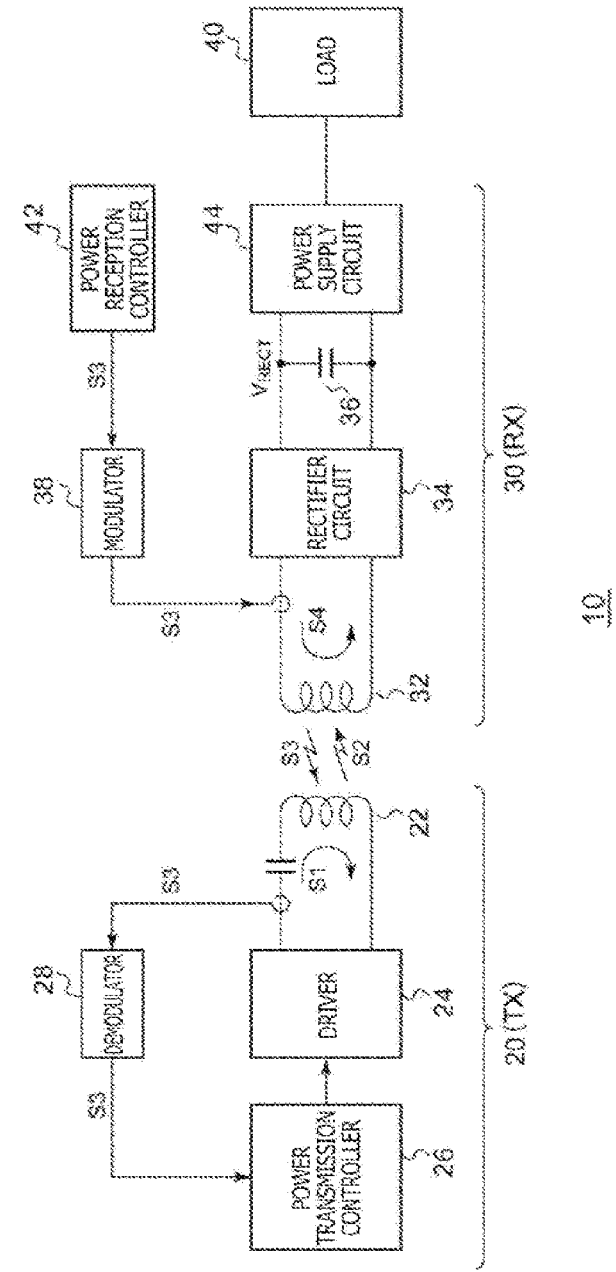
FIG. 1 is a diagram illustrating a configuration of a wireless power supply system compliant with a Qi standard.

The present disclosure will now be described based on a preferred embodiment with reference to the drawings. The same reference symbols are provided to the same or equivalent constituent elements, members, and processes illustrated in the drawings, and overlapping description will be appropriately removed. The embodiment does not limit the disclosure, and the embodiment is an example. All features and combinations of the features described in the embodiment may not be necessarily essential for the disclosure.

In the present specification, "a state in which a member A is connected to a member B" includes not only a case in which the member A and the member B are physically and directly connected, but also a case in which the member A and the member B are indirectly connected through another member that does not substantially affect the electrical connection state of the member A and the member B or that does not reduce the functions or the effects attained by the coupling of the member A and the member B.

Similarly, "a state in which a member C is provided between a member A and a member B" includes not only a case in which the member A and the member C or the member B and the member C are directly connected, but also a case in which the member A and the member C or the member B and the member C are indirectly connected through another member that does not substantially affect the electrical connection state of the member A and the member C or the member B and the member C or that does not reduce the functions or the effects attained by the coupling of the member A and the member C or the member B and the member C.

Example 1

Figure 2:
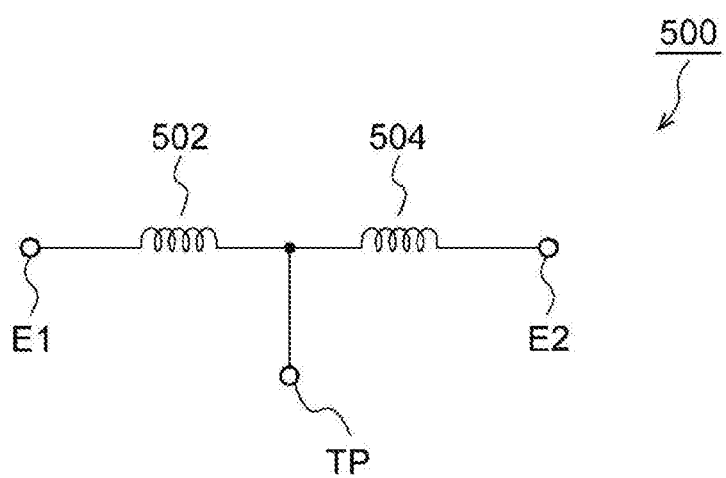
FIG. 2 is an equivalent circuit diagram of a transmission coil according to Example 1.

FIG. 2 is an equivalent circuit diagram of a transmission coil 500 according to Example 1. The transmission coil 500 is mounted on a wireless power supply apparatus. The wireless power supply apparatus is compliant with or corresponds to the Qi standard or the PMA standard that supports switching of transmission power between at least two ranges (or values).

As illustrated in FIG. 2, the transmission coil 500 includes a first coil 502, a second coil 504, and a tap TP. The first coil 502 and the second coil 504 are electrically connected in series, and the tap TP is provided at a connection node of the first coil 502 and the second coil 504.

Figure 3A:
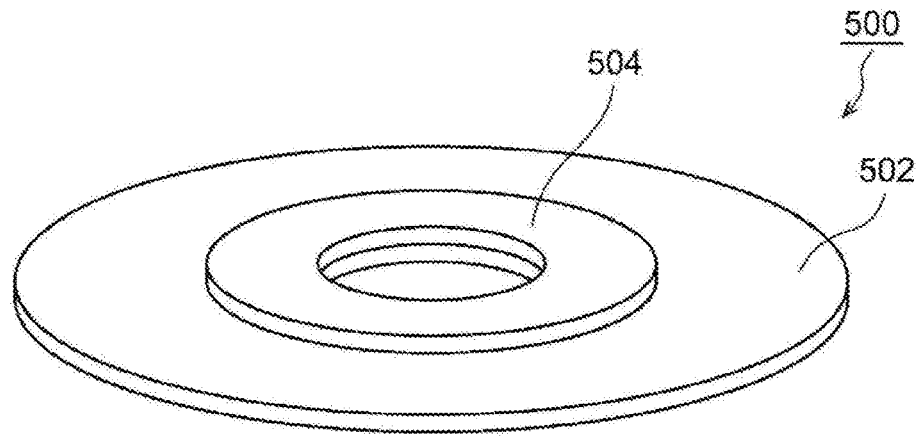
FIGS. 3A, 3B and 3C are a perspective view, a plan view, and a cross-sectional view of the transmission coil.
Figure 3B:
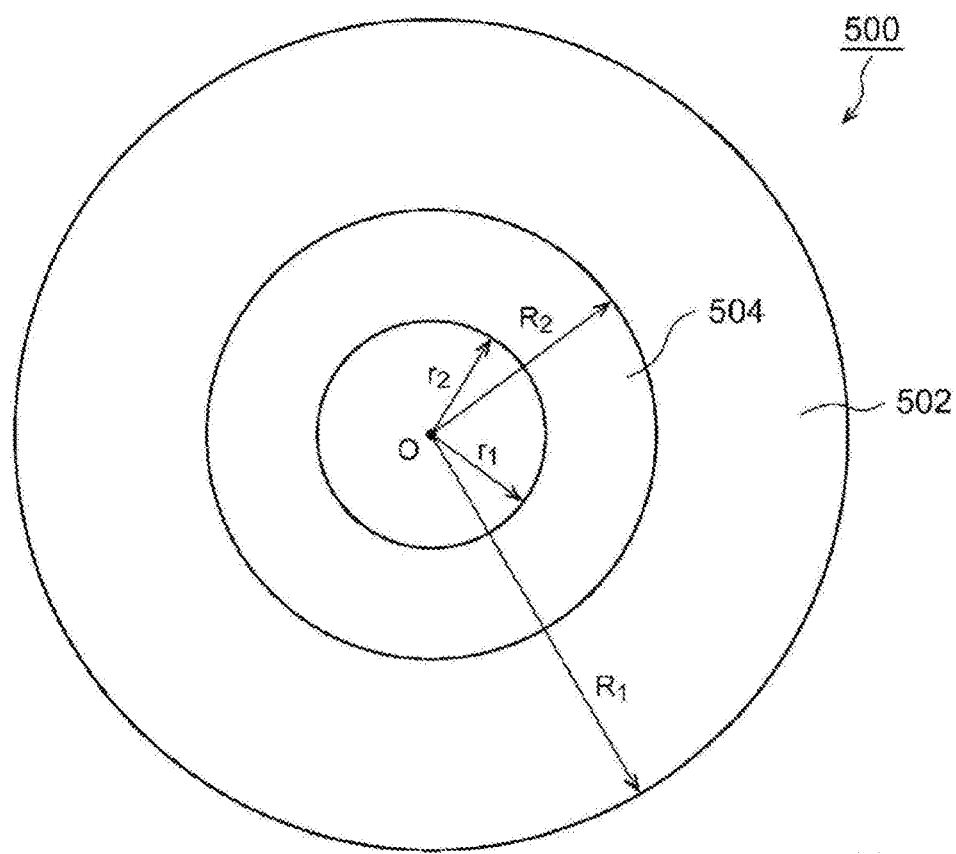
Figure 3C:
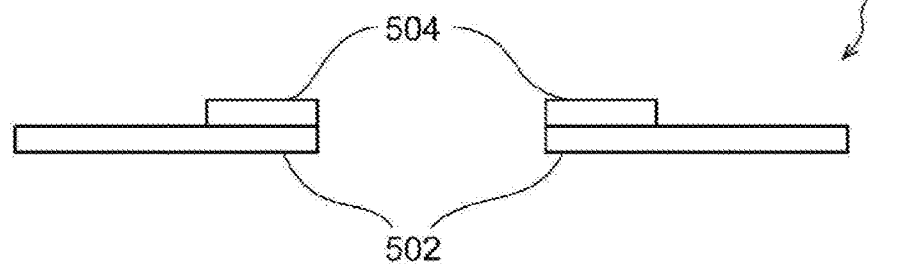

FIGS. 3A, 3B and 3C are respectively a perspective view, a plan view, and a cross-sectional view of the transmission coil 500. The first coil 502 and the second coil 504 are stacked such that centers O of the first coil 502 and the second coil 504 match, and the first coil 502 and the second coil 504 at least partially overlap with each other.

In Example 1, inner diameters r1 and r2 of the first coil 502 and the second coil 504 are substantially the same (r1≈r2), and outer diameters R1 and R2 of the first coil 502 and the second coil 504 are different (R1>R2).

The configuration of the transmission coil 500 has been described. With this transmission coil 500, an alternating-current (AC) driving signal can be applied between one of terminals E1 and E2 and the tap TP to excite only one of the first coil 502 and the second coil 504 to transmit relatively low power.

In addition, an AC driving signal can be applied between the terminals E1 and E2 to excite both the first coil 502 and the second coil 504 to transmit relatively high power.

By putting the inner circumferences together, the tap of the first coil 502 and the second coil 504 can be easily provided on the inner circumference side. Note that the first coil 502 and the second coil 504 may be formed by two independent wires first, and then the first coil 502 and the second coil 504 may be connected later. Alternatively, the first coil 502 and the second coil 504 may be formed by one common wire.

Figure 4A:
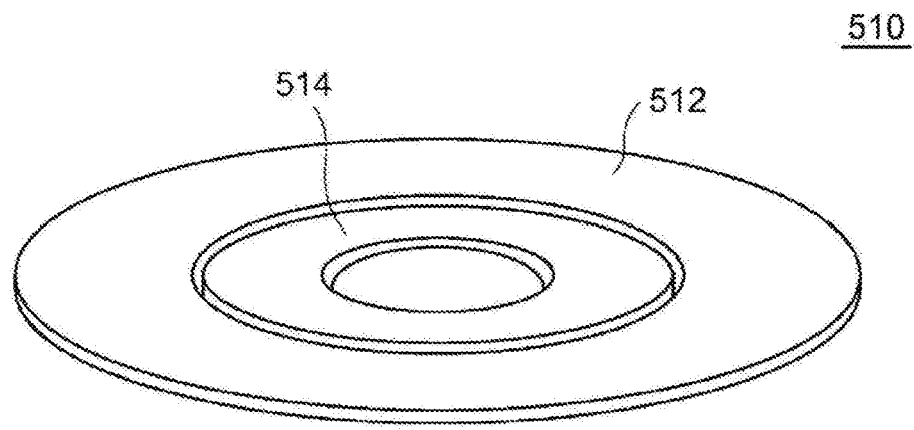
FIGS. 4A, 4B and 4C are diagrams illustrating a transmission coil according to a compared technique.
Figure 4B:
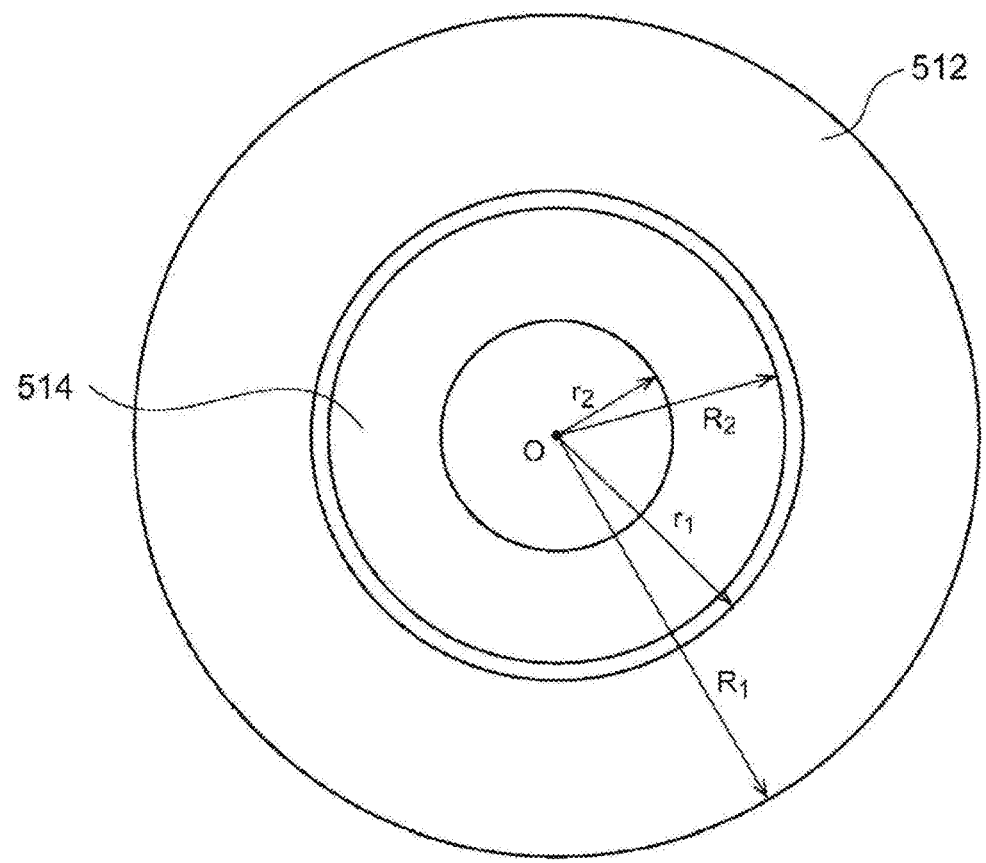
Figure 4C:
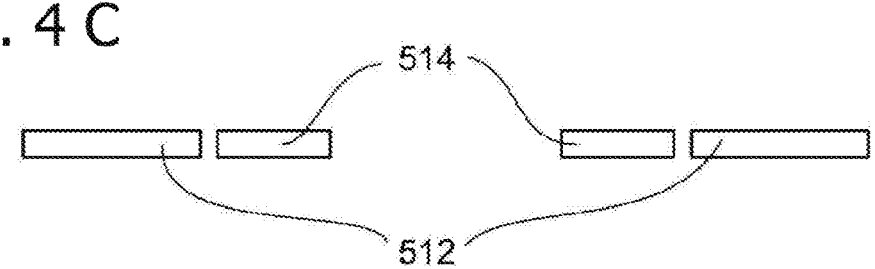

An advantage of the transmission coil 500 becomes clear by contrast with a compared technique. FIGS. 4A, 4B and 4C are diagrams illustrating a transmission coil 510 according to the compared technique. The transmission coil 510 includes a first coil 512 and a second coil 514. In the compared technique, the first coil 512 and the second coil 514 are provided on the same plane, and the second coil 514 falls within the inner circumference side of the first coil 512. That is, an inner diameter r1 of the first coil 512 is larger than an outer diameter R2 of the second coil 514 (r1>R2). In the compared technique, an outer diameter R1 of the first coil 512 may need to be larger than the outer diameter R1 of the first coil 502 to realize the same electrical characteristics (antenna characteristics) as those of Example 1. In other words, according to Example 1, the stacked structure of the first coil 502 and the second coil 504 can reduce the size (area) of the entire transmission coil 500.

Next, some examples of a method of winding the transmission coil 500 will be described.

Figure 5:
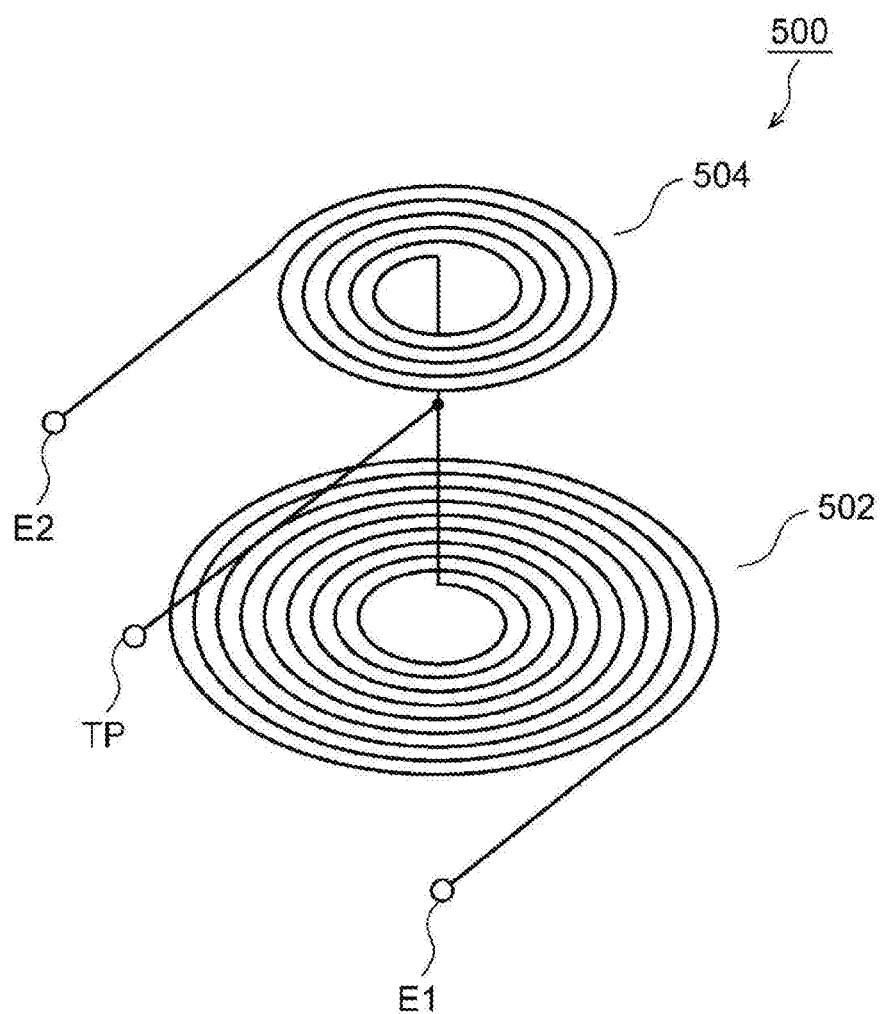
FIG. 5 is a diagram illustrating an example of a method of winding the transmission coil.

FIG. 5 is a diagram illustrating an example of the method of winding the transmission coil 500. Note that the types of wires of the first coil 502 and the second coil 504 are not particularly limited, and rectangular wires, square wires, or round wires can be used. In the example, the first coil 502 and the second coil 504 each have a single layer, and the transmission coil 500 has a double-layer alpha winding as a whole.

Figure 6:
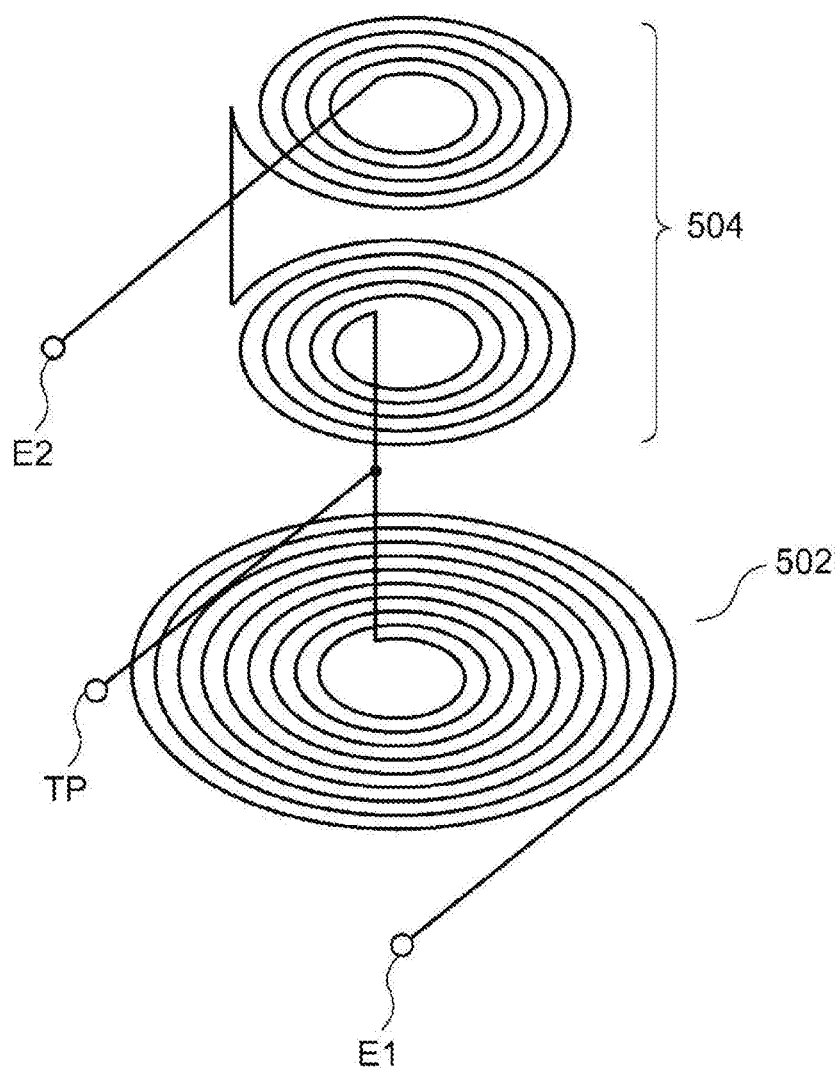
FIG. 6 is a diagram illustrating another example of the method of winding the transmission coil.

FIG. 6 is a diagram illustrating another example of the method of winding the transmission coil 500. In the example of FIG. 6, the first coil 502 has a single layer, and the second coil 504 has a double-layer alpha winding.

Figure 7:
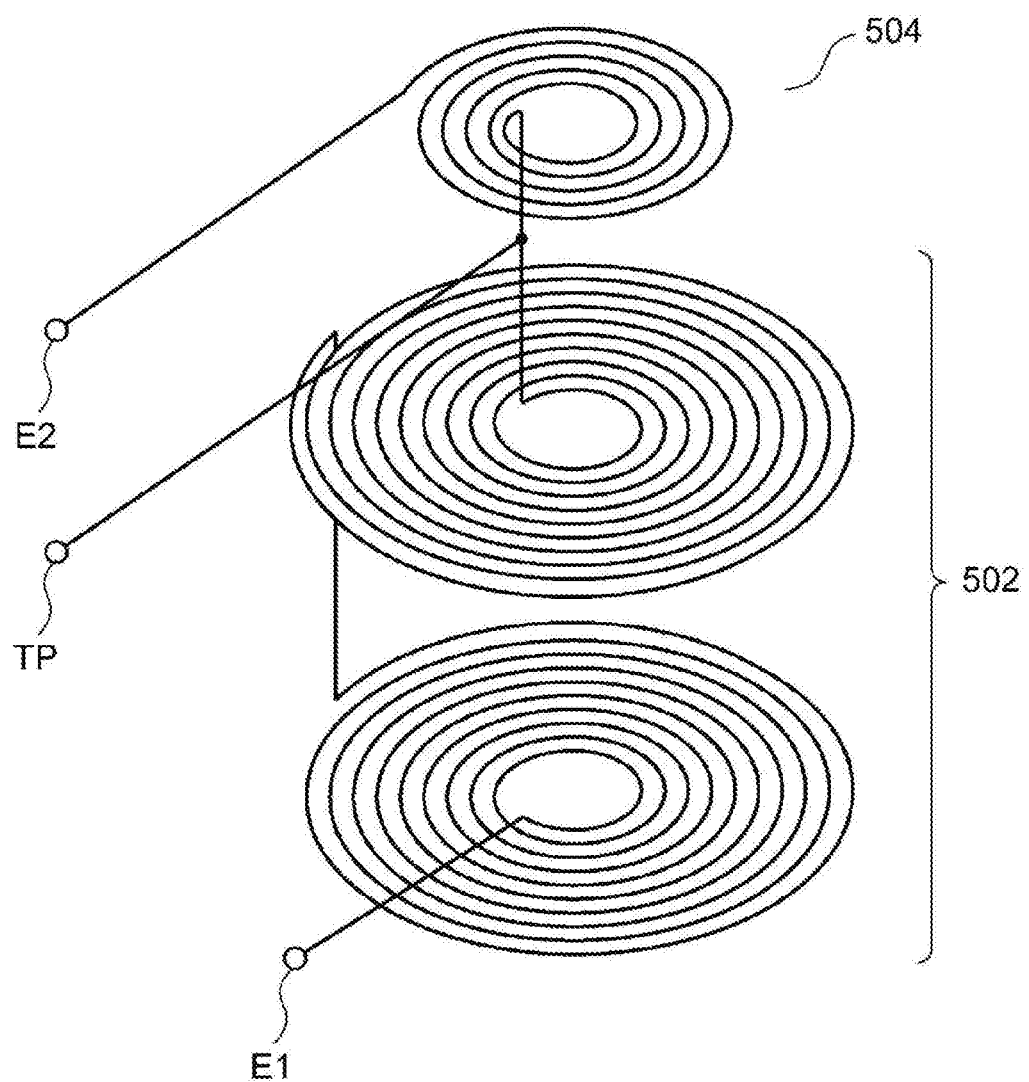
FIG. 7 is a diagram illustrating another example of the method of winding the transmission coil.

FIG. 7 is a diagram illustrating another example of the method of winding the transmission coil 500. In the example of FIG. 7, the first coil 502 has a double-layer winding, and the second coil 504 has a single layer.

Figure 8:
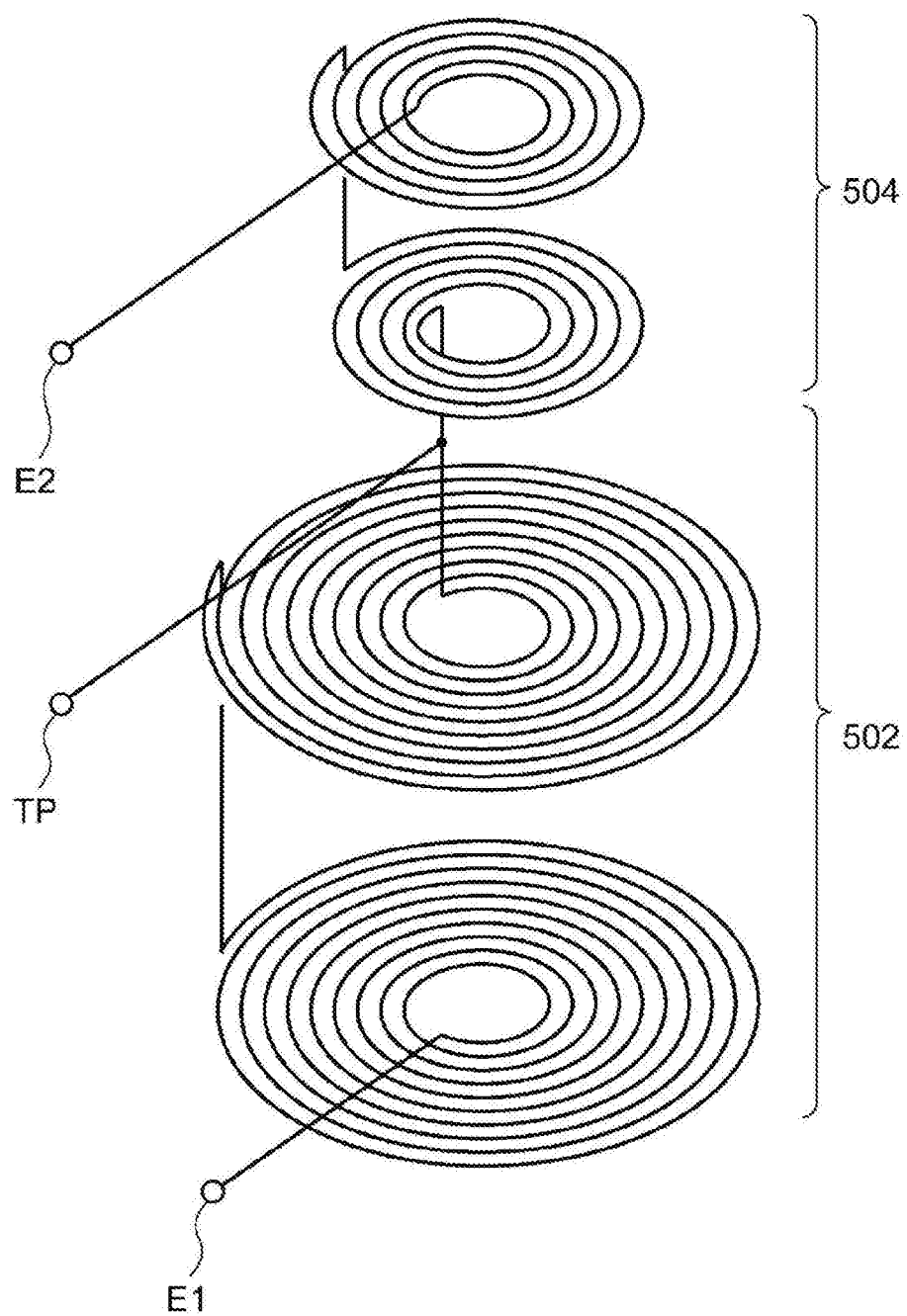
FIG. 8 is a diagram illustrating another example of the method of winding the transmission coil.

FIG. 8 is a diagram illustrating another example of the method of winding the transmission coil 500. In the example of FIG. 8, the first coil 502 and the second coil 504 each have a double-layer alpha winding.

The numbers of layers of the first coil 502 and the second coil 504 may be further increased.

Example 2

Figure 9A:
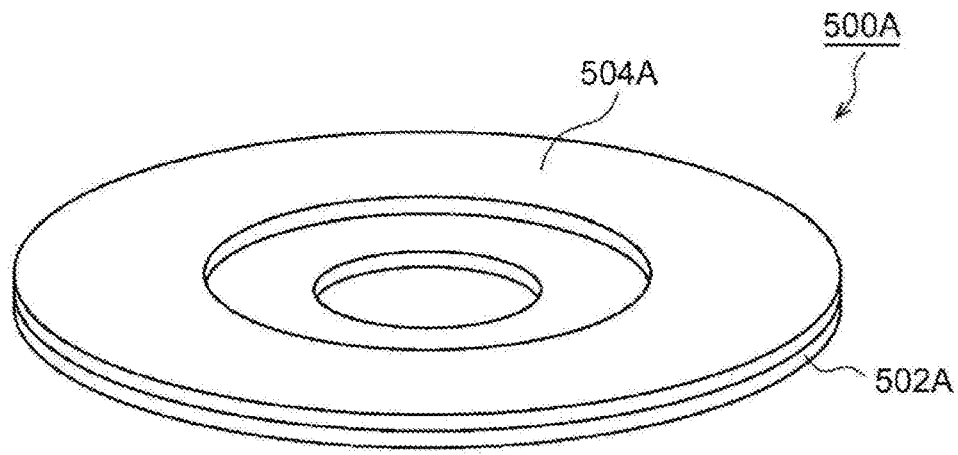
FIGS. 9A, 9B and 9C are a perspective view, a plan view, and a cross-sectional view of a transmission coil according to Example 2.
Figure 9B:
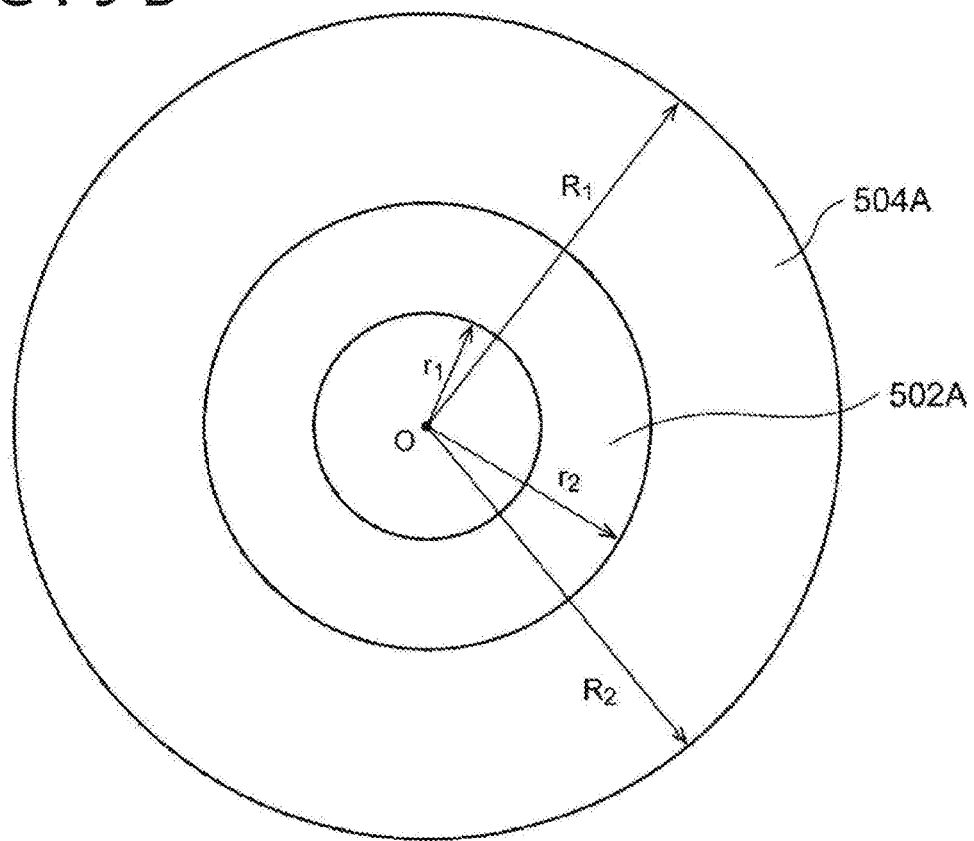
Figure 9C:
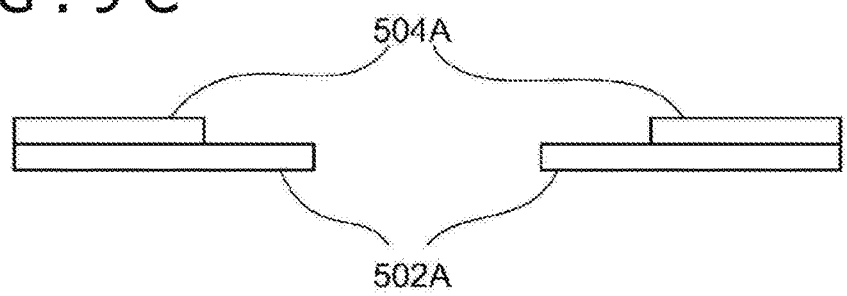

FIGS. 9A, 9B and 9C are respectively a perspective view, a plan view, and a cross-sectional view of a transmission coil 500A according to Example 2. The equivalent circuits of the transmission coil 500A are the same as the equivalent circuits of the transmission coil 500 in FIG. 2, and the transmission coil 500A includes a first coil 502A and a second coil 504A.

The transmission coil 500A according to Example 2 is similar to the transmission coil 500 of Example 1 in that the first coil 502A and the second coil 504A are stacked such that centers O of the first coil 502A and the second coil 504A match, and the windings partially overlap with each other. In Example 2, outer diameters R1 and R2 of the first coil 502A and the second coil 504A are substantially the same (R1≈R2), and inner diameters r1 and r2 of the first coil 502A and the second coil 504A are different (r1>r2).

The configuration of the transmission coil 500A has been described. With this transmission coil 500A, the same advantageous effects as in Example 1 can be obtained. Different intensity distributions (profiles) of an electromagnetic field can be obtained in Example 1 and Example 2, and an appropriate one can be selected according to the usage.

Figure 10:
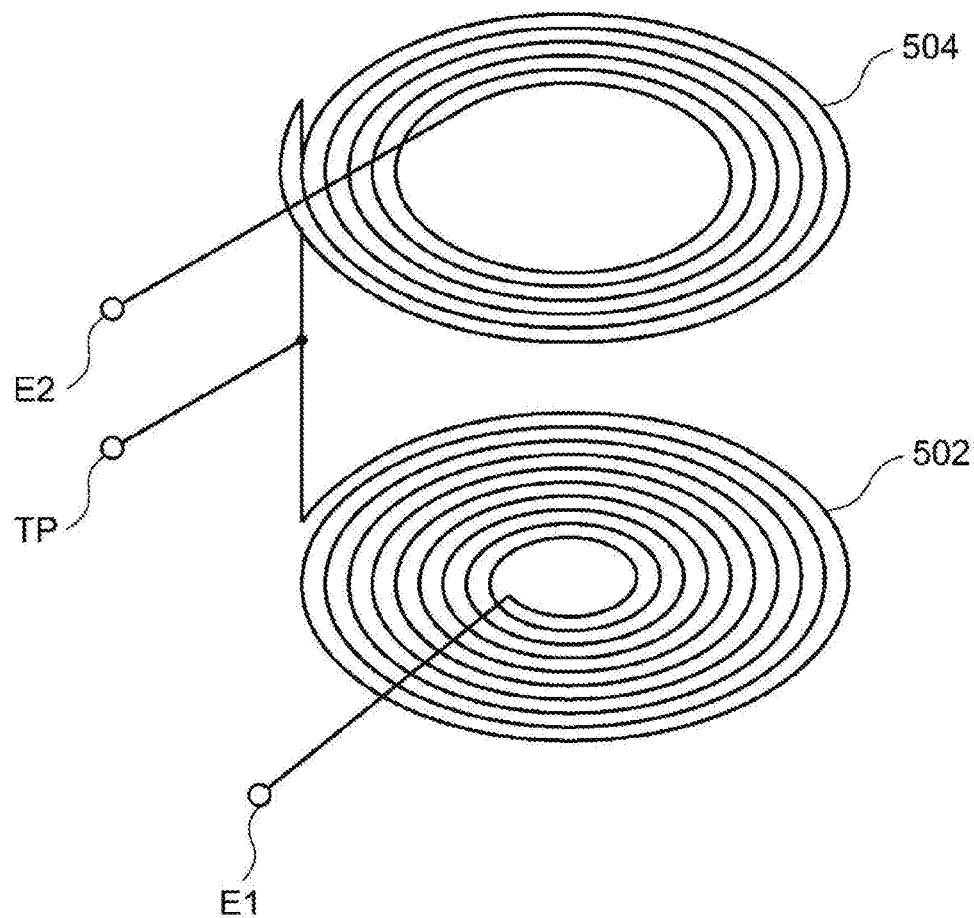
FIG. 10 is a diagram illustrating an example of the method of winding the transmission coil according to Example 2.

FIG. 10 is a diagram illustrating an example of the method of winding the transmission coil 500A according to Example 2. In the example, the first coil 502 and the second coil 504 each have a single layer, and the transmission coil 500 has a double-layer alpha winding as a whole. The first coil 502 and the second coil 504 can be easily connected on the inner circumference side. The method of winding in FIG. 10 can be associated with FIG. 4, and it can be understood that the outer circumferences and the inner circumferences of the circles are switched in the method. Similarly, the methods of winding in FIGS. 5 to 8 can be used to configure the transmission coil 500A according to Example 2.

Modification 1

Figure 11A:
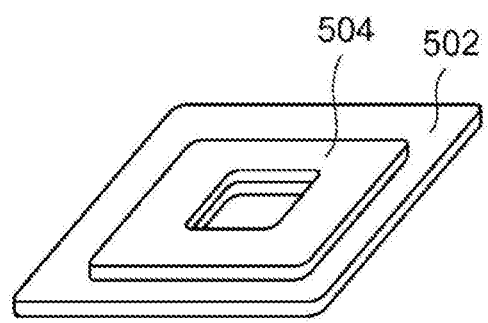
FIGS. 11A and 11B are diagrams illustrating a transmission coil according to a modification.
Figure 11B:
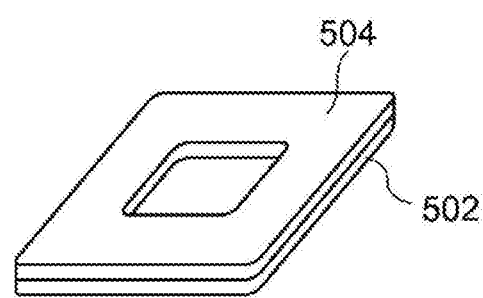

Next, a modification of the transmission coil 500 will be described. FIGS. 11A and 11B are diagrams illustrating a transmission coil 500B according to Modification 1. The transmission coil 500B is a rectangular coil. The other details are similar to the details in Example 1 or 2.

Modification 2

Although the centers of two coils substantially match in the embodiment, the arrangement is not limited to this, and the centers may be offset.

Modification 3

The inner diameters of the first coil 502 and the second coil 504 are equal in Example 1, and the outer diameters of the first coil 502 and the second coil 504 are equal in Example 2. However, the arrangement is not limited to this, and for example, a relation of r1<r2<R2<R1 may hold.

Figure 12:
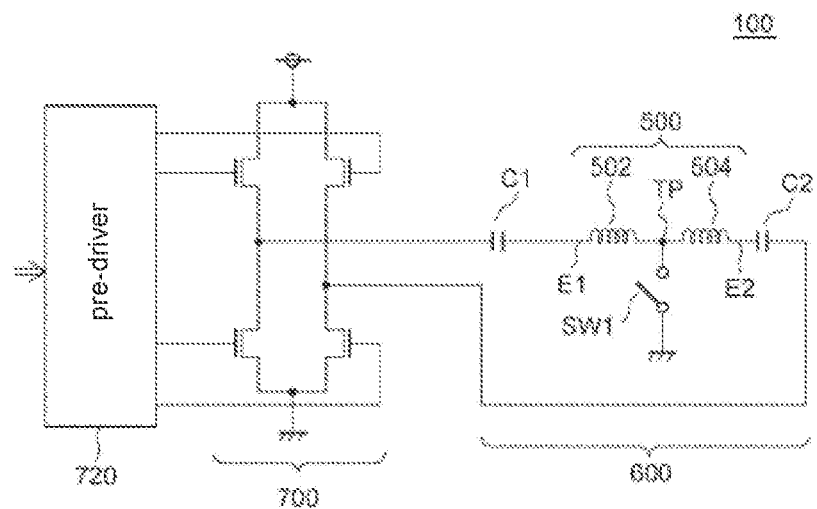
FIG. 12 is a circuit diagram of a wireless power transmitter including the transmission coil.

Next, a power transmitter including the transmission coil 500 (or the transmission coil 500A) will be described. FIG. 12 is a circuit diagram of a wireless power transmitter 100 including the transmission coil 500.

The wireless power transmitter 100 includes a transmission antenna 600 and a bridge circuit 700. The transmission antenna 600 includes the transmission coil 500, a first capacitor C1, a second capacitor C2, and a switch SW1. The first capacitor C1 and the second capacitor C2 are connected in series with the transmission coil 500. The switch SW1 is provided in parallel to a series connection circuit of the second coil 504 of the transmission coil 500 and the second capacitor C2.

The bridge circuit 700 applies an AC driving voltage VDRV between both ends of the transmission antenna 600. The bridge circuit 700 is, for example, a full-bridge circuit (H-bridge circuit). A pre-driver 720 drives the bridge circuit 700 based on a control signal from a controller not illustrated.

With this wireless power transmitter 100, the switch SW1 can be turned on or off according to the range of the transmission power to thereby switch between a state in which only the first coil 502 is excited and a state in which both the first coil 502 and the second coil 504 are excited.

The inductance of the transmission coil 500 includes inductance components L1 of the first coil 502 when the switch SW1 is on. The inductance of the transmission coil 500 includes a sum L1+L2 of the inductance of two coils 502 and 504 when the switch SW1 is off.

Providing the two capacitors C1 and C2 and optimizing the capacity values of the capacitors C1 and C2 can independently set the resonant frequency of the antenna when the switch SW1 is on and the resonant frequency of the antenna when the switch SW1 is off.

Figure 13:
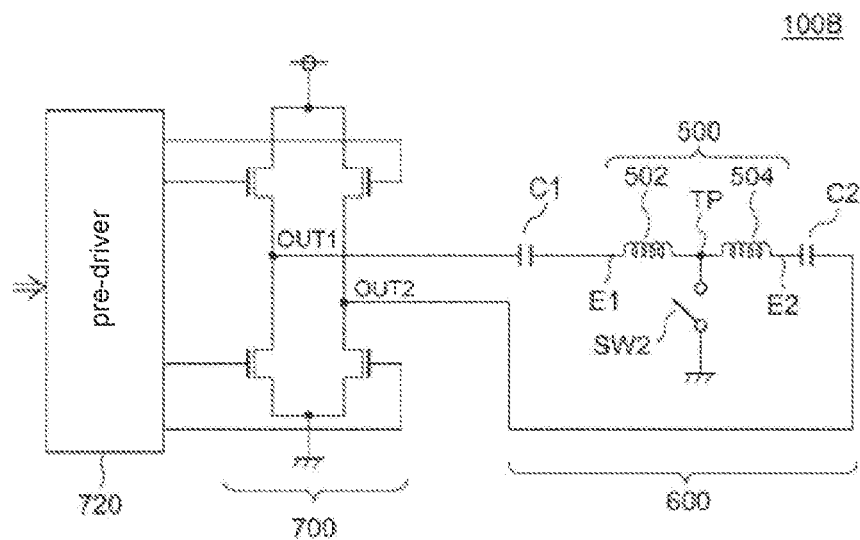
FIG. 13 is a circuit diagram of the wireless power transmitter according to a modification.

FIG. 13 is a circuit diagram of a wireless power transmitter 1008 according to a modification. A switch SW2 is provided in place of the switch SW1. The switch SW2 is provided between the tap TP and the ground. The bridge circuit 700 operates as a full-bridge circuit in the mode of transmitting high power, and the bridge circuit 700 operates as a half-bridge circuit in the mode of transmitting low power. Specifically, one output OUT2 of the bridge circuit 700 is fixed at a low level, and only the other output OUT1 of the bridge circuit 700 is switched.

Next, usage of the power transmitter 100 will be described.

Figure 14:
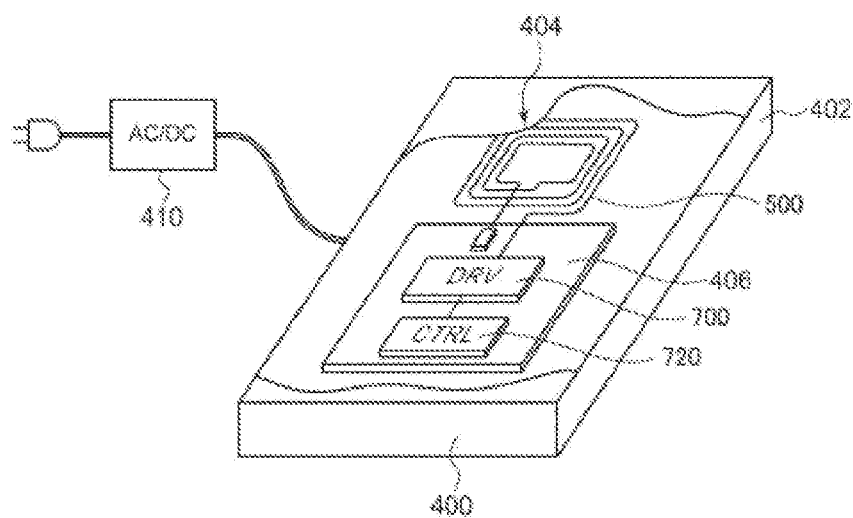
FIG. 14 is a diagram illustrating a charger and an electronic device.

FIG. 14 is a diagram illustrating a charger and an electronic device. The electronic device is placed on a charging stand of the charger. The transmission coil 500 is provided under the charging stand of the charger.

Figure 15:
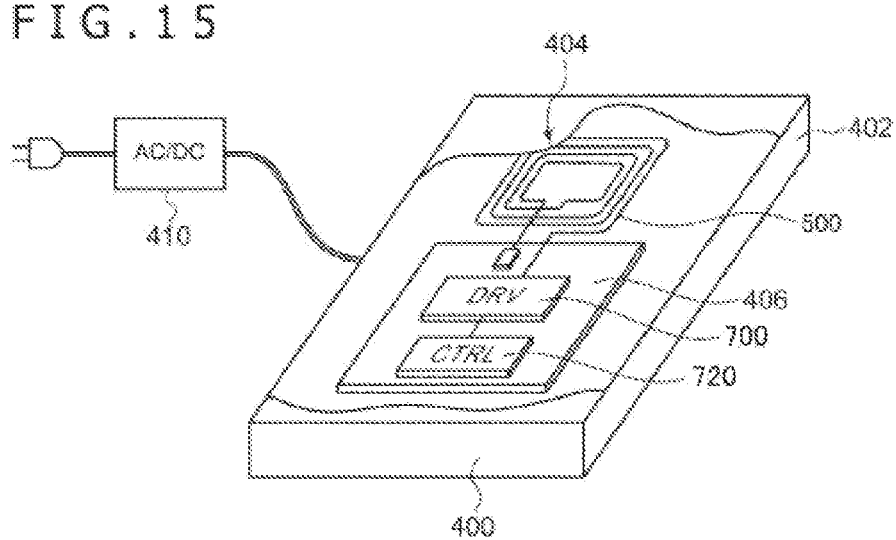
FIG. 15 is a diagram illustrating a charger including the power transmitter.

FIG. 15 is a diagram illustrating a charger 400 including the power transmitter 100. The charger 400 charges an electronic device (not illustrated) including the power receiver. The charger 400 includes a housing 402, a charging stand 404, and a circuit board 406. The electronic device to be supplied with power is placed on the charging stand 404. Circuit components, such as a bridge circuit, a pre-driver, a power transmission controller, and a demodulator, are implemented on the circuit board 406. The transmission coil 500 is laid out directly below the charging stand 404.

The charger 400 may receive a DC voltage from an AC/DC converter 410, or an AC/DC converter may be included in the charger 400. Alternatively, the charger 400 may be supplied with DC power from the outside through a bus including a power supply line, such as a Universal Serial Bus (USB).

Although specific terms are used to describe the present disclosure based on the embodiment, the embodiment merely illustrates the principle and the application of the present disclosure, and a large number of modifications and changes in arrangement can be made to the embodiment without departing from the scope of the present disclosure described in the claims.

The present disclosure contains subject matter related to that disclosed in Japanese Priority Patent Application JP 2019-065944 filed in the Japan Patent Office on Mar. 29, 2019, the entire content of which is hereby incorporated by reference.

What is claimed is:

1. A transmission coil used in a wireless power transmitter, the transmission coil comprising:
   a first coil;
   a second coil electrically connected in series with the first coil; and
   a tap provided at a connection node of the first coil and the second coil, wherein
      the first coil and the second coil are stacked to at least partially overlap with each other,
      an inner diameter of the first coil is equal to an inner diameter of the second coil, and
      an outer diameter of the first coil is different from an outer diameter of the second coil.

2. The transmission coil according to claim 1, wherein centers of the first coil and the second coil match.

3. A transmission antenna, comprising:
   a transmission coil used in a wireless power transmitter, wherein the transmission coil includes:
      a first coil,
      a second coil electrically connected in series with the first coil, and
      a tap provided at a connection node of the first coil and the second coil, wherein
         the first coil and the second coil are stacked to at least partially overlap with each other,
         an inner diameter of the first coil is equal to an inner diameter of the second coil, and
         an outer diameter of the first coil is different from an outer diameter of the second coil;
   a first capacitor;
   a second capacitor, wherein
      the first capacitor is connected in series with the first coil, and
      the second capacitor is connected in series with each of the first coil and the second coil; and
   a switch provided in between the tap TP and a ground voltage.

4. A wireless power transmitter, comprising:
   a transmission antenna including:
      a transmission coil used in the wireless power transmitter, wherein the transmission coil includes:
         a first coil,
         a second coil electrically connected in series with the first coil, and
         a tap provided at a connection node of the first coil and the second coil, wherein
            the first coil and the second coil are stacked to at least partially overlap with each other,
            an inner diameter of the first coil is equal to an inner diameter of the second coil, and
            an outer diameter of the first coil is different from an outer diameter of the second coil,
      a first capacitor,
      a second capacitor, wherein
         the first capacitor is connected in series with the first coil, and
         the second capacitor is connected in series with each of the first coil and the second coil, and
      a switch provided in between the tap TP and a ground voltage; and
   a bridge circuit configured to drive the transmission antenna.

5. The wireless power transmitter according to claim 4, wherein the wireless power transmitter is compliant with at least one of a Qi standard or a Power Matters Alliance standard.

6. A transmission coil used in a wireless power transmitter, the transmission coil comprising:
   a first coil;
   a second coil electrically connected in series with the first coil; and
   a tap provided at a connection node of the first coil and the second coil, wherein the first coil and the second coil are stacked to at least partially overlap with each other,
      an inner diameter of the first coil is smaller than an inner diameter of the second coil, and
      an outer diameter of the first coil is equal to an outer diameter of the second coil.

7. The transmission coil according to claim 6, wherein centers of the first coil and the second coil match.

* * * * *